United States Patent
Lari

(10) Patent No.: US 9,655,350 B2
(45) Date of Patent: May 23, 2017

(54) FISH DISPLAY AND WATER CIRCULATION APPARATUS HAVING INDIVIDUALLY REMOVABLE LIVE FISH CONTAINERS

(71) Applicant: Nick L. Lari, Jacksonville, FL (US)

(72) Inventor: Nick L. Lari, Jacksonville, FL (US)

(73) Assignee: NEW PCA, LLC, Orange Park, FL (US)

( * ) Notice: Subject to any disclaimer, the term of this patent is extended or adjusted under 35 U.S.C. 154(b) by 0 days.

(21) Appl. No.: 14/931,220

(22) Filed: Nov. 3, 2015

(65) Prior Publication Data

US 2016/0050893 A1 Feb. 25, 2016

Related U.S. Application Data

(63) Continuation-in-part of application No. 14/027,675, filed on Sep. 16, 2013.

(60) Provisional application No. 61/700,927, filed on Sep. 14, 2012, provisional application No. 61/718,442, filed on Oct. 25, 2012, provisional application No. 62/074,977, filed on Nov. 4, 2014.

(51) Int. Cl.
*A01K 63/00* (2006.01)
*A01K 63/04* (2006.01)
*A01K 63/02* (2006.01)

(52) U.S. Cl.
CPC .......... *A01K 63/047* (2013.01); *A01K 63/003* (2013.01); *A01K 63/006* (2013.01); *A01K 63/02* (2013.01)

(58) Field of Classification Search
CPC ....... A01K 63/00; A01K 63/003; A01K 63/04

USPC ....... 119/245, 247, 248, 249, 250, 251, 253, 119/269; 47/59 R, 62 R

See application file for complete search history.

(56) References Cited

U.S. PATENT DOCUMENTS

| | | | | |
|---|---|---|---|---|
| 3,693,591 A | * | 9/1972 | Stasio | A01K 61/006 119/245 |
| 3,757,739 A | * | 9/1973 | Whitener | A01K 63/003 119/224 |
| 3,774,575 A | * | 11/1973 | Patterson | A01K 63/003 119/245 |
| 4,177,604 A | * | 12/1979 | Friesen | A01G 31/02 47/62 R |
| 4,211,034 A | * | 7/1980 | Piesner | A01G 31/02 47/59 R |
| 4,402,280 A | * | 9/1983 | Thomas | A01K 1/031 119/418 |
| 5,042,425 A | * | 8/1991 | Frost, Jr. | A01K 63/003 119/246 |
| 5,197,409 A | * | 3/1993 | Hammond | A47F 5/0025 119/245 |

(Continued)

FOREIGN PATENT DOCUMENTS

JP 2007166911 A * 7/2007

*Primary Examiner* — Monica Williams
*Assistant Examiner* — Morgan T Barlow
(74) *Attorney, Agent, or Firm* — Mark Young, PA

(57) ABSTRACT

A fish display apparatus continuously circulating water through a plurality of removable live fish containers, whereby a large number of individual containers containing one or more fish may be easily displayed to customers and whereby any single container may be removed by the customer for purchase of the fish contained therein without stopping or interfering with the flow of water passing through the remaining containers.

12 Claims, 13 Drawing Sheets

(56) References Cited

U.S. PATENT DOCUMENTS

| | | | | |
|---|---|---|---|---|
| 5,365,886 A * | 11/1994 | Frost, Jr. | A01K 63/003 | 119/267 |
| 5,377,622 A * | 1/1995 | Lauttenbach | A01K 61/005 | 119/200 |
| 5,413,070 A * | 5/1995 | DeWalt | A01K 63/003 | 119/247 |
| D362,135 S * | 9/1995 | Wilson | D6/672 | |
| 5,469,810 A * | 11/1995 | Chiang | A01K 63/003 | 119/225 |
| 5,474,024 A * | 12/1995 | Hallock | A01K 1/031 | 119/417 |
| 5,513,596 A * | 5/1996 | Coiro, Sr. | A01K 1/031 | 119/457 |
| 6,125,791 A * | 10/2000 | Gundersen | A01K 63/003 | 119/228 |
| 6,257,170 B1 * | 7/2001 | Gundersen | A01K 63/003 | 119/228 |
| 6,305,324 B1 * | 10/2001 | Hallock | A01K 63/003 | 119/248 |
| 6,357,392 B1 * | 3/2002 | Ido | A01K 61/02 | 119/248 |
| 6,553,939 B1 * | 4/2003 | Austin | A01K 1/031 | 119/455 |
| 6,729,266 B1 * | 5/2004 | Gabriel | A01K 1/031 | 119/419 |
| 7,174,850 B2 * | 2/2007 | Hsiao | A01K 61/005 | 119/204 |
| 7,421,976 B1 * | 9/2008 | Travers | A01K 63/003 | 119/264 |
| 7,594,481 B2 * | 9/2009 | Carter | A01K 1/031 | 119/418 |
| 7,810,452 B2 * | 10/2010 | Pieretto | A01K 63/00 | 119/245 |
| 2003/0006177 A1 * | 1/2003 | Lari | A01K 63/045 | 210/123 |
| 2004/0144328 A1 * | 7/2004 | Bonner | A01K 1/03 | 119/455 |
| 2005/0166858 A1 * | 8/2005 | Lari | A01K 63/003 | 119/269 |
| 2006/0102086 A1 * | 5/2006 | Abraham | A01K 61/008 | 119/217 |
| 2009/0095226 A1 * | 4/2009 | Riemma | A01K 63/065 | 119/245 |
| 2009/0126269 A1 * | 5/2009 | Wilson | A01G 31/00 | 47/62 R |
| 2010/0071629 A1 * | 3/2010 | Wu | A01K 63/04 | 119/207 |
| 2011/0041395 A1 * | 2/2011 | Newbold | A01G 1/00 | 47/1.4 |
| 2011/0041773 A1 * | 2/2011 | Brielmeier | A01K 1/031 | 119/419 |
| 2011/0290007 A1 * | 12/2011 | Sudkamp | A01K 63/04 | 73/60.11 |
| 2011/0290189 A1 * | 12/2011 | Myers | A01K 63/00 | 119/200 |
| 2012/0091058 A1 * | 4/2012 | Byrd | A01K 63/04 | 210/610 |

* cited by examiner

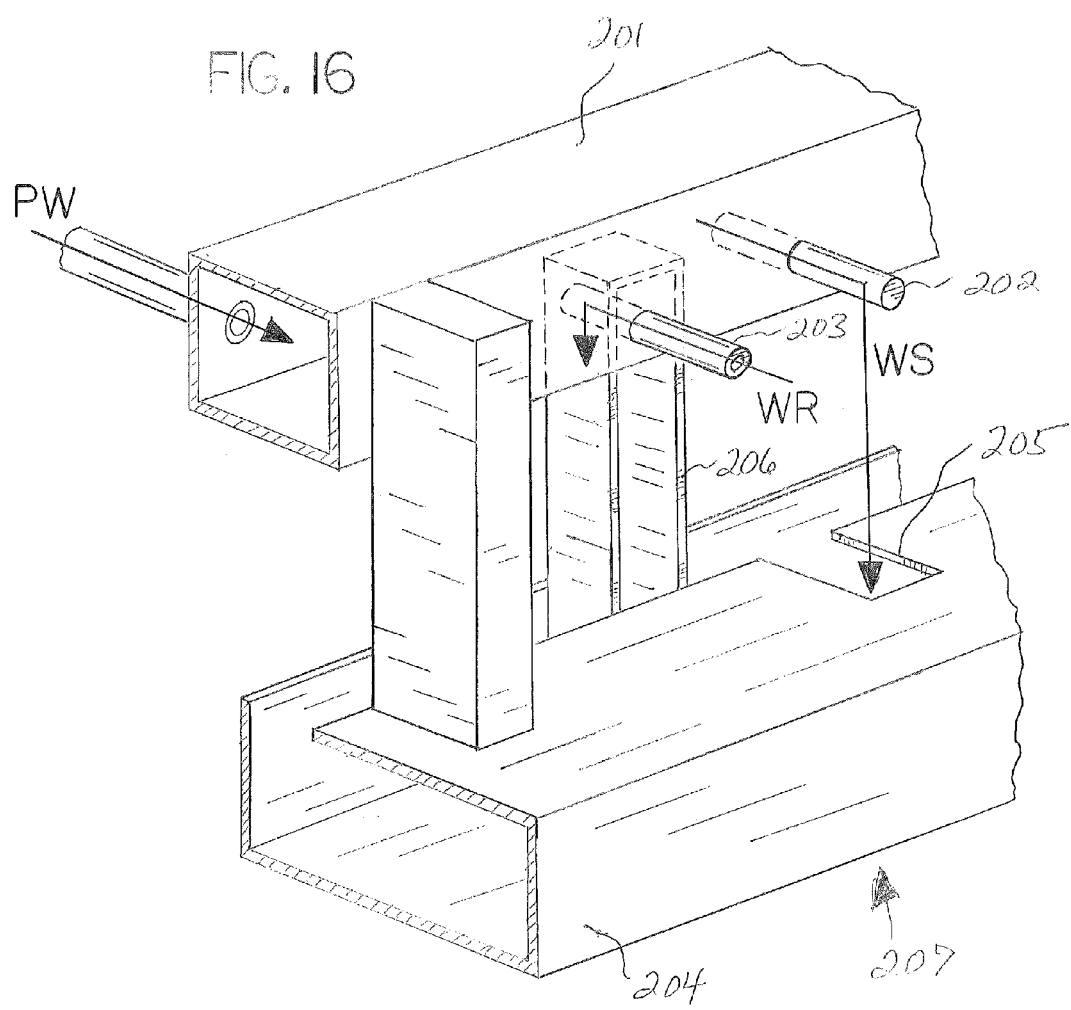

FISH DISPLAY AND WATER CIRCULATION APPARATUS HAVING INDIVIDUALLY REMOVABLE LIVE FISH CONTAINERS

This application is a continuation-in-part application of pending U.S. patent application Ser. No. 14/027,675, filed Sep. 16, 2013, which claims the benefit of U.S. Provisional Patent Application Ser. No. 61/700,927, filed Sep. 14, 2012, and U.S. Provisional Patent Application Ser. No. 61/718,442, Oct. 25, 2012. This continuation-in-part application further claims the benefit of U.S. Provisional Patent Application Ser. No. 62/074,977, filed Nov. 4, 2014. The disclosures of the earlier applications are incorporated herein by reference.

BACKGROUND OF THE INVENTION

Pet stores must maintain large quantities of live fish for sale to consumers. In most cases, fish of similar type are housed in a single aquarium and individual fish are removed by hand netting and transferred into individual containers or bags when purchased. Certain fish, such as the Siamese fighting or Betta fish, must be isolated in separate containers to prevent the fish from attacking each other. These fish thus require special care, handling and display.

Housing large numbers of non-aggressive fish in multiple tanks is an inefficient and cost-intensive method in terms of retail sales. For a consumer to purchase fish, a store employee must be found, who then must scoop out the desired fish into a container, typically a plastic bag, tie the bag to prevent leakage and mark the bag as necessary so that the cashier knows the correct cost. Furthermore, standard aquariums require fairly regular upkeep, which also requires employee man-hours.

It is an object of this invention to provide an improved apparatus to display fish and continuously circulate water through a plurality of individually removable live fish containers, whereby a large number of individual containers containing one or more fish may be simultaneously displayed to customers and whereby any single fish container may be removed by a customer for purchase of the fish contained therein without interfering with the flow of water through the remaining fish containers, and further whereby flow of water into the space previously occupied by the removed container is halted, diverted or captured within the apparatus. The containers are preferably provided with removable lids and information markings, e.g., bar codes, such that consumers can select the desired fish container, remove it from the display apparatus, and pay for the purchase at the cash register without having to locate and engage store personnel.

SUMMARY OF THE INVENTION

In a first embodiment, the invention is a fish display apparatus continuously circulating water through a plurality of removable live fish containers, whereby a large number of individual containers containing one or more fish may be simultaneously displayed to consumers and whereby any single container may be removed by a customer for purchase of the fish contained therein without interfering with or interrupting water flow through the remaining containers. The apparatus comprises in general a multi-shelf array or assembly in fluid communication with a reservoir tank containing a water pump to deliver water into and through the individual fish containers. The water is supplied to the individual containers through a vertically oriented supply conduit in fluid communication with multiple horizontally oriented transverse supply troughs. Individual containers are arrayed in rows beneath the transverse supply troughs in association with displacement valves positioned on the undersides of the transverse supply conduits or troughs. Each of the individual containers is provided with a physical mechanism to open the associated valve such that water will be delivered into the container when the fish container is in place. An outflow opening or conduit delivers excess water from each container into one of multiple horizontally oriented transverse return troughs or conduits. Excess water from the transverse supply troughs and the water from the transverse return troughs enters a vertically oriented return conduit and is delivered back into the reservoir tank. The displacement valves in the bottom member of the transverse supply troughs are open only when a container is in position below the valve, such that when a container is removed or not present the valve is in the closed status.

In a second embodiment, the invention is a fish display apparatus continuously circulating water through a plurality of removable live fish containers, whereby a large number of individual containers containing one or more fish may be simultaneously displayed to consumers and whereby any single container may be removed by a customer for purchase of the fish contained therein without interfering with or interrupting water flow through the remaining containers. The apparatus comprises in general a multi-shelf array or assembly in fluid communication with a reservoir tank containing a water pump to deliver water into a superiorly positioned gravity tank for distribution to the individual fish containers. The water is supplied to the individual containers through a vertically oriented supply conduit depending from the gravity tank and multiple horizontally oriented transverse supply conduits having individual apertures. Individual containers are arrayed in rows below the transverse supply conduits and are associated with individual rocker valves positioned beneath the apertures of the transverse supply conduits. When there is no container in position at a given location in the array, the rocker valve diverts water directly into the multiple horizontally oriented transverse return troughs. When a container is inserted into the array the associated rocker valve is pivoted so that water from the aperture of the transverse supply conduit is diverted into the container. An outflow opening delivers excess water from each container into the multiple horizontally oriented transverse return troughs. Excess water from the gravity tank and the water from the transverse return troughs enters a vertically oriented return conduit and is delivered back into the reservoir tank.

In one embodiment of the invention, the valves of the invention comprise displacement valves. In another embodiment of the invention, the valves of the invention comprise rocker valves, whereby for each said valve associated with one of said fish containers, said rocker valve delivers water from said transverse supply conduits into said fish container when said fish container is retained on said shelves, and whereby said rocker valve delivers water from said transverse supply conduits into said transverse return troughs when said fish container is removed from said shelves.

In a third embodiment described herein, the invention is a fish display apparatus continuously circulating water through a plurality of removable live fish containers, whereby a large number of individual lidded containers containing one or more fish may be simultaneously displayed to consumers and whereby any single container may be removed by a customer for purchase of the fish contained therein without interfering with or interrupting water flow through the remaining containers. The apparatus comprises in general a multi-shelf array or assembly in fluid communication with a reservoir tank containing a water pump to deliver water into and through the individual fish containers. The water is supplied to the individual containers through a vertically oriented supply conduit in fluid communication with multiple horizontally oriented, elongated, transverse water supply chambers. Individual containers are arrayed in rows adjacent the transverse water supply chambers in association with paired water supply and water return tubes, the water supply tubes being in fluid communication with the water supply chamber. Each of the individual containers is provided with a pair of self-closing valves that receive the water supply tube and the water return tube, the valves being opened by the tubes when a container is loaded in the display system and closed when the container is removed from the display system. In this manner water is continuously delivered into the container when the fish container is in place. The water return tube delivers excess water from each container into a vertically oriented discharge chute in communication with a lower transverse return conduit. Water from the transverse return conduits enters a vertically oriented return conduit and is delivered back into the reservoir tank.

In alternate language, the invention is a fish display and water circulation apparatus comprising a plurality of individually removable fish containers; a multi-shelf assembly comprising a plurality of transverse water supply conduits and transverse water return conduits and adapted to receive said fish containers; a reservoir tank retaining water, said reservoir tank in fluid communication with said water supply conduits and said water return conduits; a water pump delivering water from said reservoir tank to said water supply conduits; water supply tubes in fluid communication with said water supply conduit and water return tubes in fluid communication with said water return conduits; each said fish container comprising a pair of self-closing, one-way valves, one of said pair of valves positioned to mate and fluidly communicate with one of said water supply tubes and the other of said pair of valves positioned to mate and fluidly communicate with one of said water return tubes when said fish container is received on said multi-shelf assembly; whereby said water supply tubes and said water return tubes open said valves when said water supply tubes and said water return tubes are mated with said pair of valves in said fish container, such that water flows into said fish container through said water supply tube and water flows from said fish container through said water return tube; and whereby upon removal of said fish container from said multi-shelf assembly said valves automatically close to preclude water flowing from said fish container and water from said water supply tube is directed into said water return conduit. Furthermore, the invention wherein said water supply tubes each comprising a downwardly directed outflow opening and said water return conduit comprising bypass openings, each said bypass opening positioned beneath one of said outflow openings of said water supply tubes, whereby upon removal of said fish container from said multi-shelf assembly water is directed through said outflow opening and into said water return conduit through said bypass opening; further comprising a discharge chute associated with each said water return tube, each said discharge chute being in fluid communication with one of said water supply conduits, whereby with said fish container received by said multi-shelf assembly water from said fish container passes through said water return tube and into said water return conduit through said discharge chute; wherein said valves comprise displacement valves; wherein said valves comprise duckbill valves; whereby water flow through said fish containers is continuous when said water pump is in operation; wherein each said fish container comprises an alignment slot and said multi-shelf assembly comprises alignment ridges to properly align said fish containers on said multi-shelf assembly; and/or wherein said alignment slots and said alignment ridges are tapered.

BRIEF DESCRIPTION OF THE DRAWINGS

FIG. 16 is a partial front perspective view showing one station of an alternative embodiment of a shelf array with the container of FIG. 13 having been removed. The pump water is continuously delivered into the water supply chamber, as shown by the PW arrow, and falls from water supply tube down into the transverse return conduit through the surface opening, as shown by the WS arrow. The normal flow path of the return water through the water return tube, shown by the RW arrow, no longer occurs since no water is entering the water return tube.

DETAILED DESCRIPTION OF THE INVENTION

Figure 1:
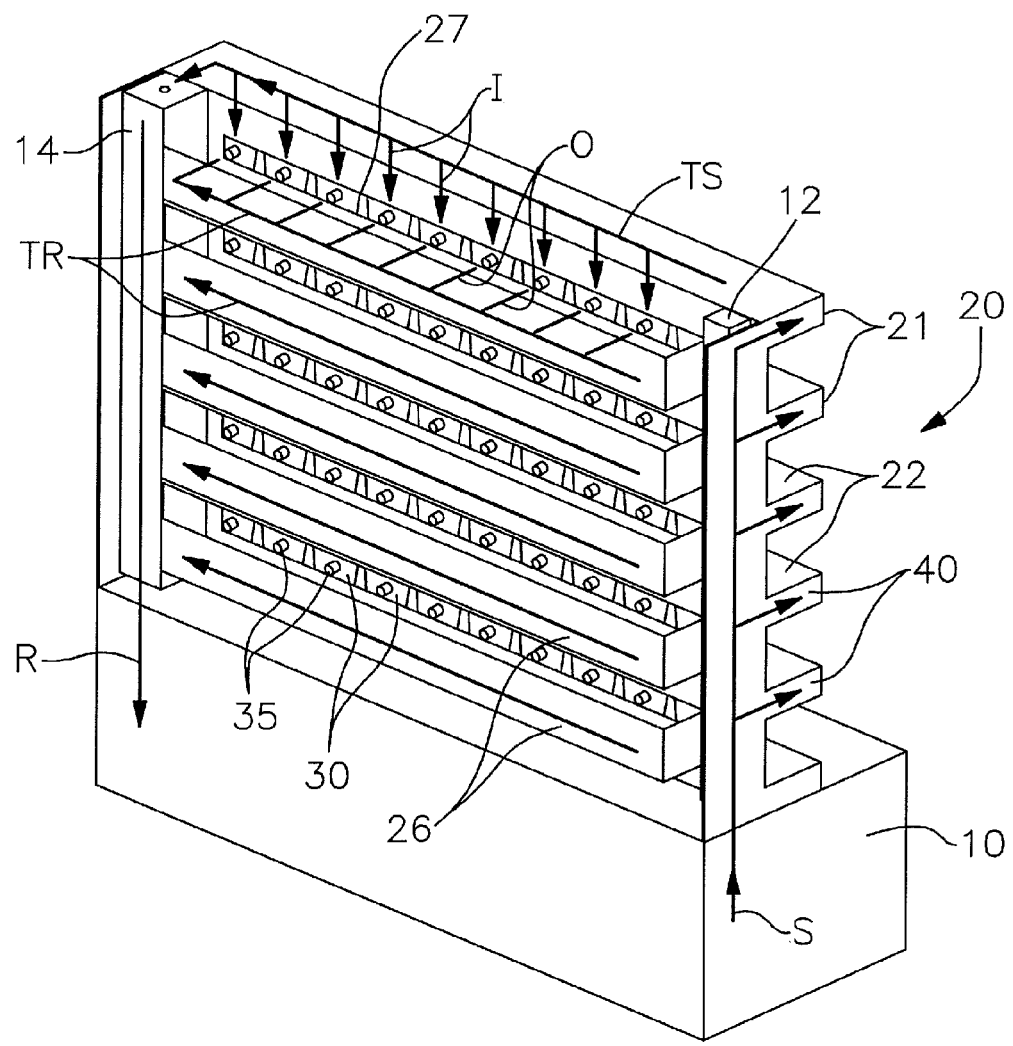
FIG. 1 is a rear perspective view of a first embodiment of the invention.
Figure 2:
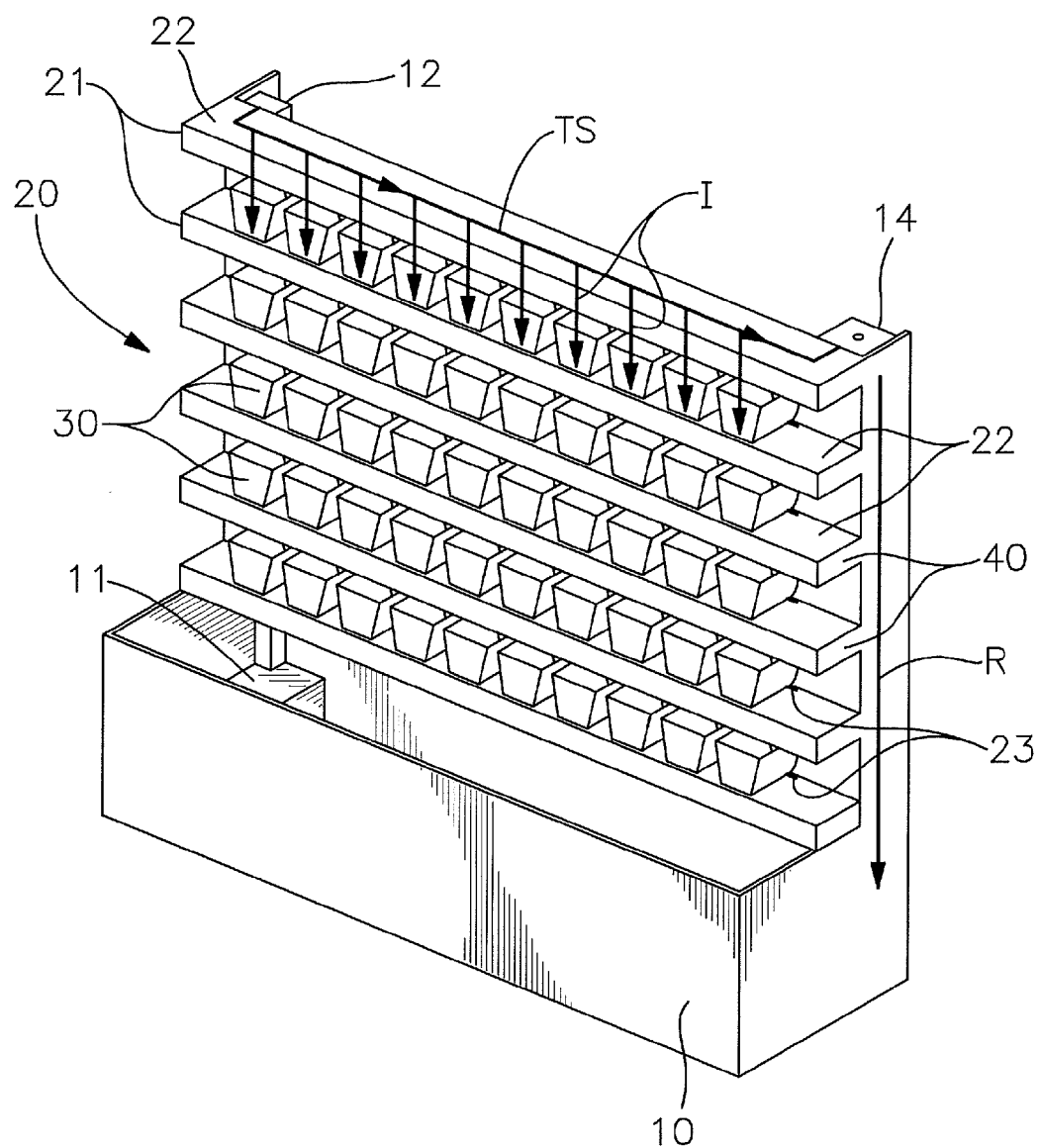
FIG. 2 is a front perspective view of the embodiment of FIG. 1.
Figure 3:
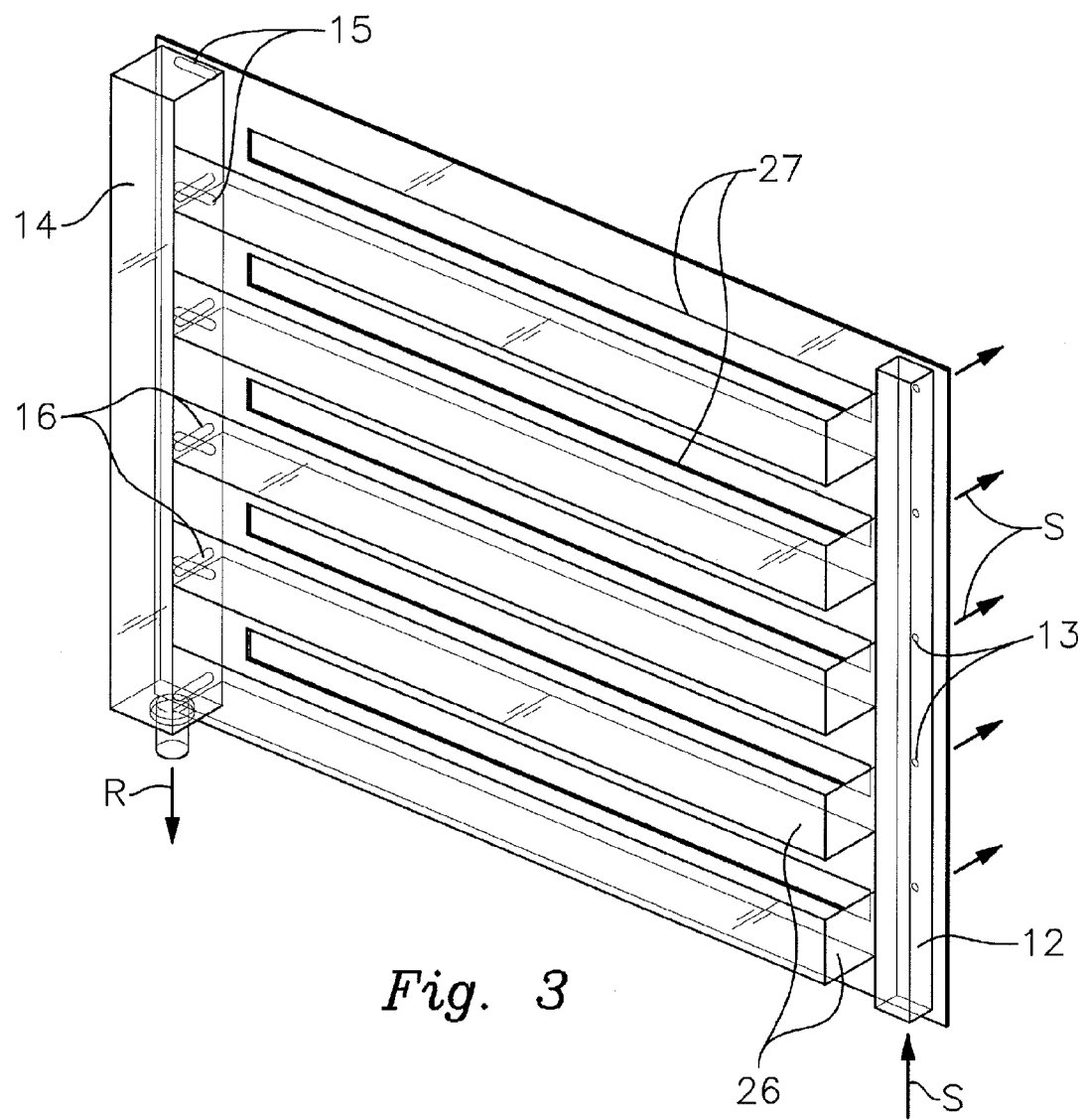
FIG. 3 is a rear perspective view of a portion of the embodiment of FIG. 1.

As shown in the embodiments depicted in the drawings, the illustrations being intended as non-limiting, the invention is in a first embodiment an apparatus adapted to display fish and to continuously circulate water through a plurality of removable live fish containers 30, whereby a large number of individual fish containers 30 containing for example a single fish may be easily displayed to customers and whereby any single container 30 may be removed by the customer for purchase of the fish contained therein without ceasing water flow to the remaining fish containers 30. The apparatus comprises in general a multi-shelf array or assembly 20 in fluid communication with a reservoir tank 10 containing a water pump 11 to deliver water into the individual fish containers 30. The water is supplied to the individual containers 30 through a vertically oriented supply conduit 12 having a plurality of supply orifices, spouts or nozzles 13, each supply orifice 13 being associated with one of a plurality of horizontally oriented transverse supply conduits 21, preferably in this embodiment in the form of troughs. Each transverse supply conduit 21 comprises a bottom member 24, and except for the uppermost transverse supply conduit 21, defines a horizontal shelf 40 that comprises an upper support member 22 to support fish containers 30. Alternatively, the first containers 30 may be suspended beneath the horizontal shelves 40. Drain apertures 23 are preferably provided on upper support members 22 of the transverse supply conduits 21, except for the uppermost transverse supply conduit 21, such that any spilled or excess water may be directed into transverse return troughs 26. Each transverse supply conduit 21 has a horizontally oriented transverse return trough 26 associated therewith, the term "trough" being used herein to designate any suitable return conduits structured to receive water from either the fish containers 30 or the transverse supply conduits 21.

Figure 4:
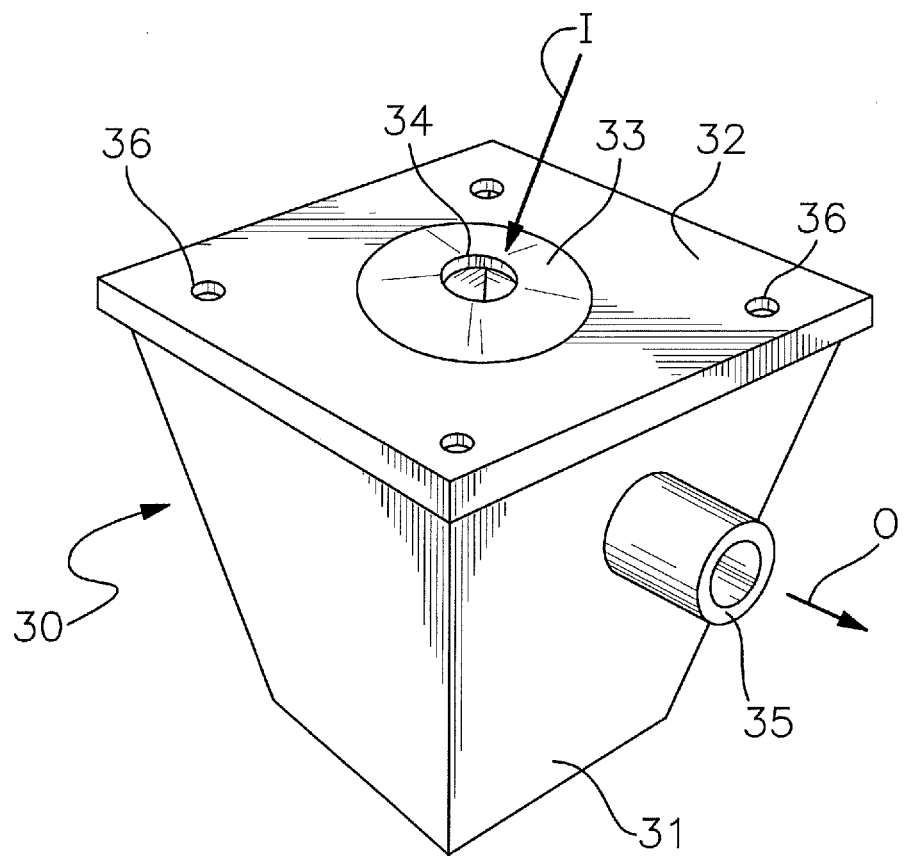
FIG. 4 is a perspective view of an embodiment for an individual fish container.
Figure 5:
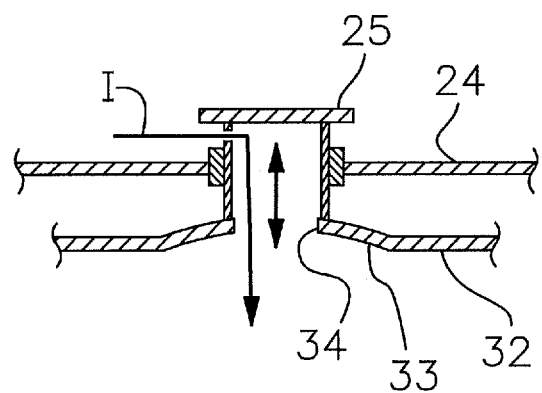
FIG. 5 is a cross-sectional view of an embodiment for a displacement valve.
Figure 6:
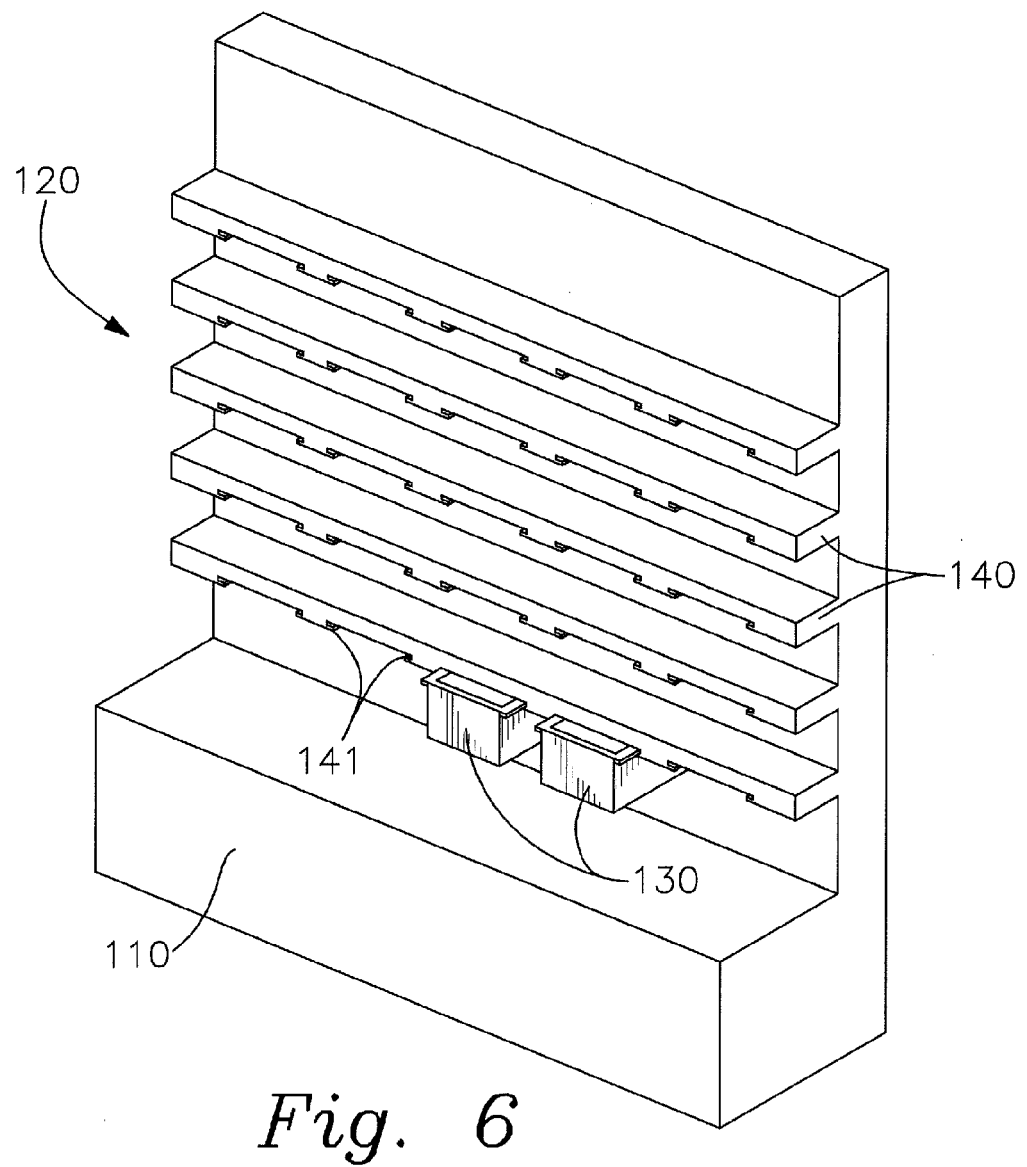
FIG. 6 is a front perspective view of a second embodiment of the fish display apparatus showing a small number of individual fish containers in position on the array.
Figure 7:
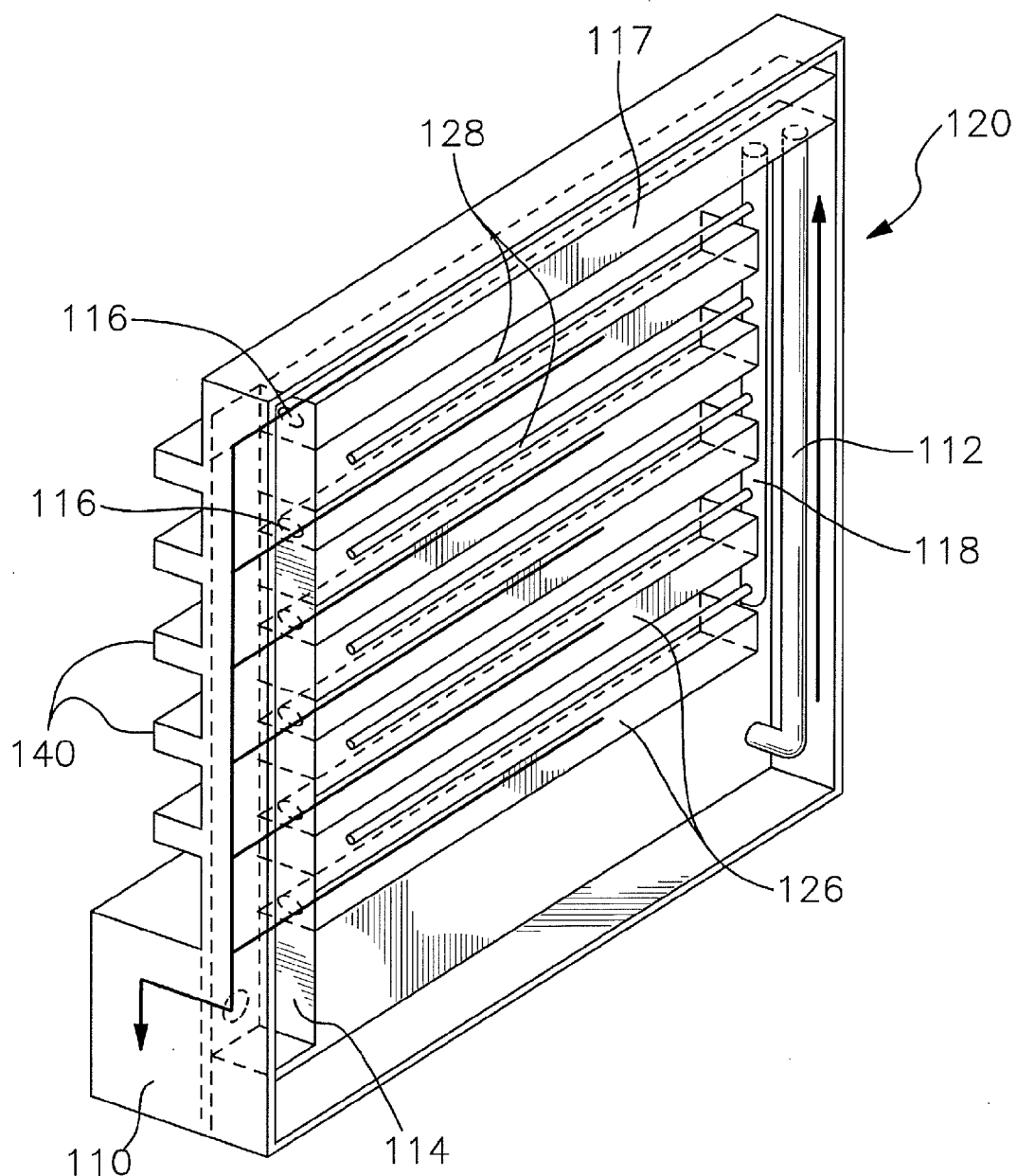
FIG. 7 is a rear perspective view of the embodiment of FIG. 6.
Figure 8:
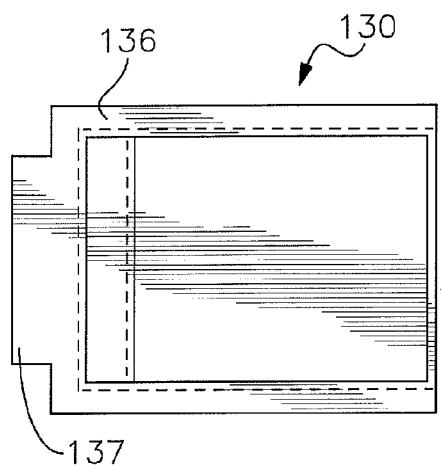
FIG. 8 is a top view of an embodiment of an alternative embodiment of an individual fish container.
Figure 9:
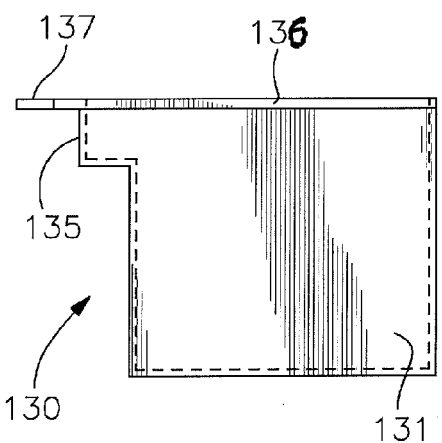
FIG. 9 is a side view of the embodiment of the individual fish container shown in FIG. 8.

Individual fish containers 30 are arrayed in rows beneath the transverse supply conduits 21, and preferably are retained on the upper support members 22 of the next lower transverse supply conduit 21. Each container 30 comprises a base 31, a lid 32 and a valve actuating mechanism 33. In the embodiment shown in FIG. 4, the valve actuating mechanism 33 comprises a raised area surrounding an inflow opening 34 in the container lid 32. Each container 30 also comprises an outflow opening, spout or conduit 35 positioned in the upper portion of the container base 31. The containers 30 are arrayed beneath the transverse supply conduits 21 such that the outflow conduits 35 face to the rear and direct water into the transverse return troughs 26. The transverse return troughs 26 may be provided with a single or multiple front openings or windows 27 to receive the outflow conduits 35. Vents 36 may be provided in the container lids 32.

A plurality of valves 25, in this embodiment preferably of the biased displacement type whereby the valve 35 is opened only when a surface or object is positioned beneath the valve 25, are located in spaced relation on the bottom members 24 of the transverse supply conduits 21. The valves 35 are spaced such that a single valve 35 is associated with a single container 30. Thus, with a container 30 properly positioned beneath the transverse supply trough 26, the valve actuating mechanism 33 opens the associated valve 35 such that water may be delivered from the transverse supply conduit 21 into the container 30.

Excess water from the transverse supply conduits 21 and the water delivered into the transverse return troughs 26 from the outflow conduits 35 of the containers 30 pass through front return openings 15 and side return openings 16, respectfully, into a vertically oriented return conduit 14, such that the water is delivered back to the reservoir tank 10 for recirculation.

As shown in the drawings, water flow paths through the apparatus comprise a supply path S going up the supply conduit 12 through the supply orifices 13 and into the transverse supply conduits 21, a transverse supply path TS through the transverse supply conduits 21 and into the return conduit 14, an inflow path I from the transverse supply conduits 21 down through the valves 25 and into the inflow openings 34 of the containers 30, an outflow path O from the containers 30 through the outflow conduits 35 and into the transverse return troughs 26, a transverse return path TR through the transverse return troughs 26 and into the return conduit 14, and a return path R down through the return conduit 14 into the reservoir tank 10.

Operation of the apparatus is accomplished by providing a plurality of individual containers 30 each containing water and one or more fish. The containers 30 are positioned in the proper locations on the transverse supply conduits 21 such that each container 30 is associated with a valve 25, the presence of a container 30 actuating the valve 25 from closed status to open status. If not already operational, the pump 11 is turned on and water is pumped into the supply conduit 12 and through the supply orifices 13 to direct water into the interiors of the transverse supply conduits 21. A portion of this water is delivered through each open valve 25 into the containers 30 beneath a given transverse supply conduit 21 such that fresh water is constantly circulated through the containers 30, the excess water from each container 30 passing from the outflow conduits 35 into the transverse return troughs 26 for delivery through the return conduit 14 into the reservoir tank 10. Excess water in the transverse supply conduits 21 not delivered into the individual containers 30 passes directly into the return conduit 14 and back into the reservoir tank 10. When a container 30 is removed from the shelf array assembly 20, the valve 25 automatically closes to preclude loss of water from the transverse supply conduit 21. The containers 30 may be provided with barcodes or other pricing indicia. Preferably, seals for closure of the outflow opening 35 and/or the inflow opening 34 are provided for use at time of purchase when the containers 30 are to be kept by the customer.

With this apparatus, a plurality of fish containers 30 may be optimally displayed during business hours, the apparatus providing for a continuous flow of water through the containers 30 to provide an invigorating and healthy environment for the fish. Consumers may choose and remove individual containers 30 for purchase without requiring assistance from the store personnel. Restocking the containers 30 is easily accomplished since each container 30 can be individually removed and replaced. Because of the automatic valve operation, any number of containers 30 less than the maximum allowable number may be accommodated at any given time.

Preferably the reservoir tank 10 and the shelf array assembly 20 are constructed as a single unit, but it is understood that these components could be physically separated and hoses, tubes or the like used to deliver water from the reservoir tank 10 to the supply conduit 12 and to return water to the reservoir tank 10 from the return conduit 14. Furthermore, the water could be supplied to the top of the supply conduit 12 rather than up through the bottom.

As shown in the embodiments depicted in the drawings, the illustrations being intended as non-limiting, the invention in a second embodiment is an apparatus or array 120 adapted to display fish and to continuously circulate water through a plurality of removable live fish containers 130, whereby a large number of individual containers 130 containing for example a single fish may be easily displayed to customers and whereby any single container 130 may be removed by the customer for purchase of the fish contained therein. The apparatus 120 comprises in general an array or assembly having a plurality of shelves 140 providing display locations for the fish containers 130, each of which is in fluid communication with a reservoir or sump tank 110 containing a water pump to deliver water through a vertically oriented supply conduit 112 into a gravity tank 117 located near the top of the apparatus 120. The water is then supplied by gravity to the individual containers 130 through a vertically oriented distribution conduit 18 that delivers water to multiple horizontally oriented transverse supply conduits 128. Each transverse supply conduit 128 comprises a plurality of openings, apertures or nozzles 129, each of which is associated with the location of an individual fish container 130. Each transverse supply conduit 128 has a horizontally oriented transverse return trough 126 associated therewith for return of water for recirculation through the system, the term "trough" being used herein to designate any suitable return conduits structured to receive water from either the fish containers 130 or the transverse supply conduits 128.

Individual fish containers 130 are arrayed in rows associated with the transverse supply conduits 128 and are retained within receiving slots 141 located on each of the horizontal shelves 140 of the array 120. Each container 130 comprises a base 131, lateral support flanges 136, a rear outflow opening 135, and a rear displacement flange or tab 137, as shown in FIGS. 8-10 and 12. The containers 130 are arrayed such that the outflow openings 135 face to the rear and direct water into the transverse return troughs 126. Screen covers may be provided for the containers 130 to prevent the fish from jumping from the containers 130.

Figure 10:
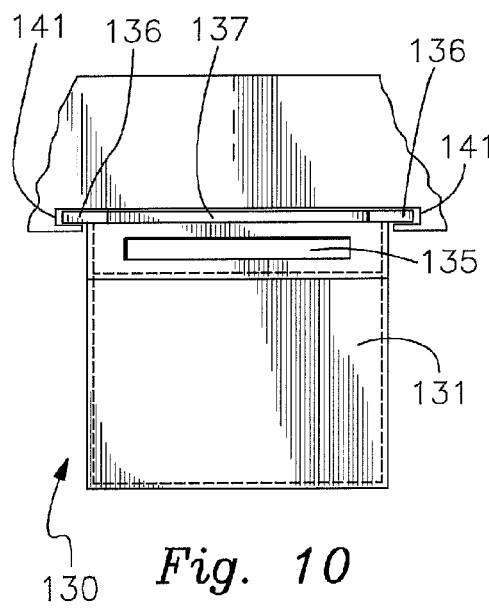
FIG. 10 is a rear view of the embodiment of the individual fish container shown in FIG. 8 as inserted into the receiving slots of the embodiment of the fish display apparatus of FIG. 6.
Figure 11:
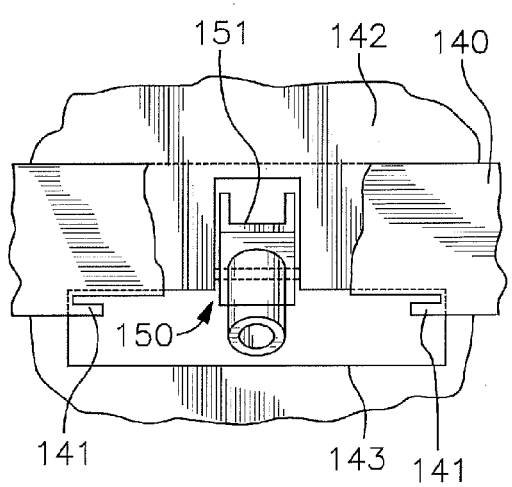
FIG. 11 is a partially exposed front view of a portion of the embodiment of the fish display apparatus of FIG. 6 showing the rocker valve.
Figure 12:
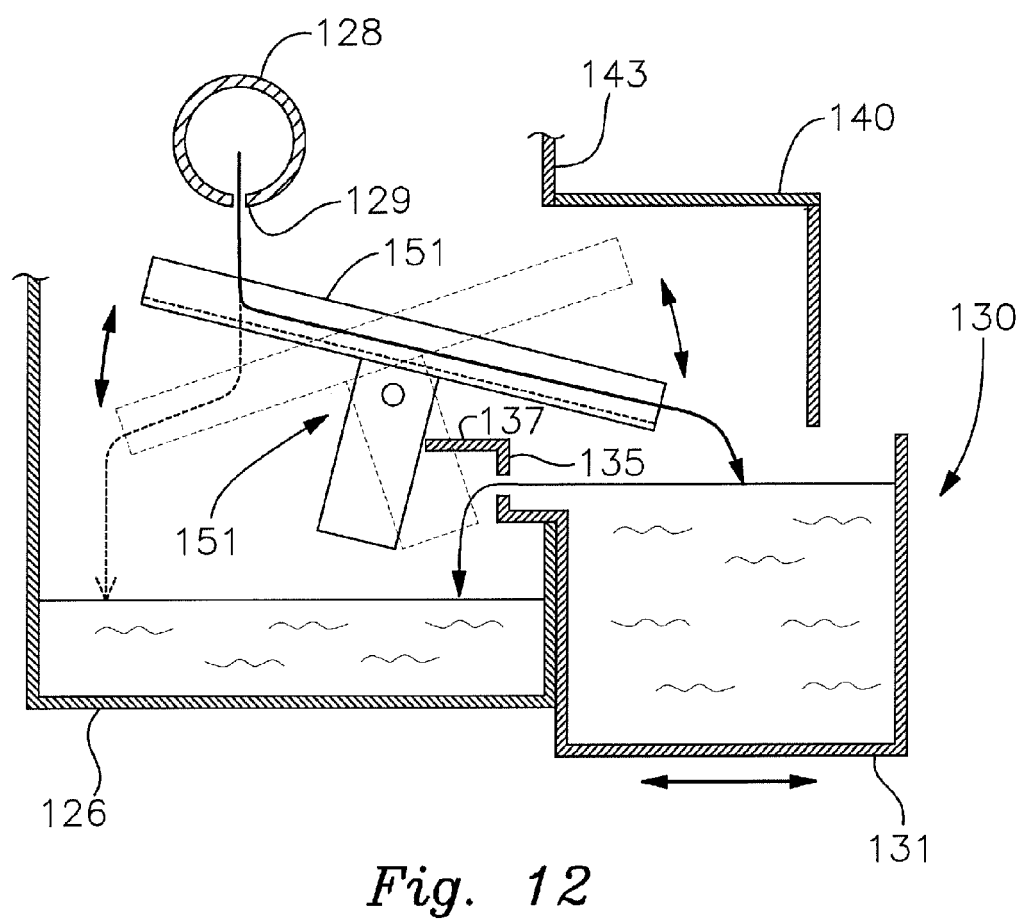
FIG. 12 is a partial cross-sectional view of the embodiment of the individual fish container shown in FIG. 8 as inserted into the receiving slots of the embodiment of the fish display apparatus of FIG. 6 and illustrating operation of the rocker valve.
Figure 13:
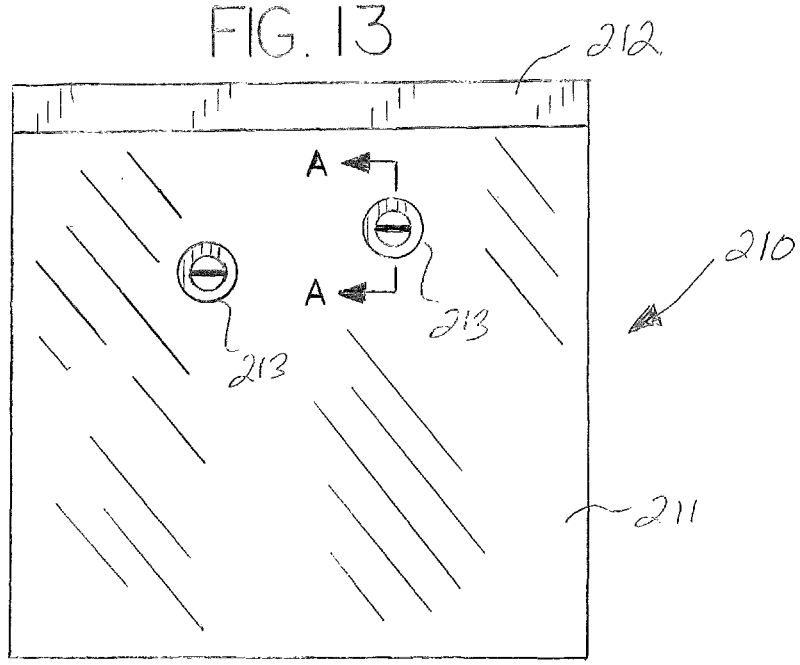
FIG. 13 is a rear view of an alternate embodiment of a fish container showing a removable lid, and two self-sealing valves that mate with the water supply tube and the water return tube.
Figure 14:
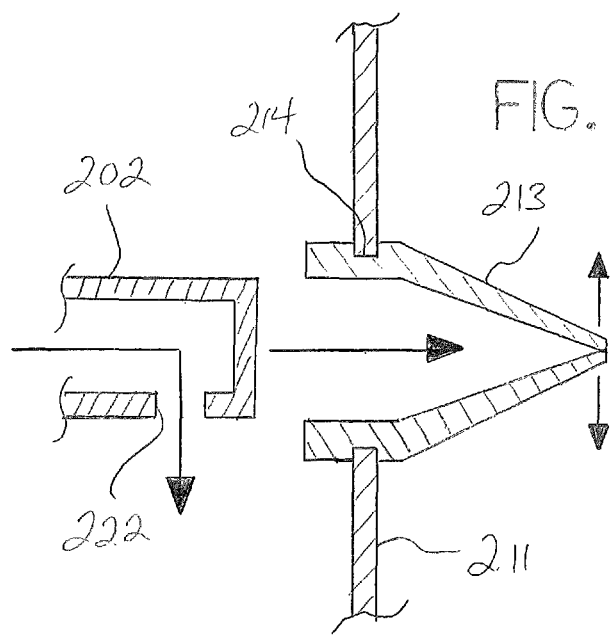
FIG. 14 is a partial cross-sectional view taken along line A-A of FIG. 13, showing the discharge end of the water supply tube and its associated self-sealing valve, the valve being shown in the sealed neutral position prior to insertion of the container onto the water supply tube.

A rocker valve 150 is associated with each fish container 130 location. Each rocker valve 150 comprises a directional channel 151 with opposing open ends, the directional channel 151 being pivotally mounted such that either end of the directional channel 151 may be lower than the other. Each rocker valve 150 is positioned relative to an opening 129 in the transverse supply conduit 128 such that water from the transverse supply conduit 128 is directed onto the rear portion of the directional channel 151, i.e., to a point to the rear of the pivot axis of the rocker valve 150, as shown in FIG. 12. The front end of the directional channel extends through an opening or slot 143 in the main wall 142 of the shelf array assembly so as to be poisoned above a fish container 130. As shown in FIG. 11, when no fish container 130 is in position in a given location, the directional channel 151 is tilted to the rear by water pressure such that water flows directly into the transverse return troughs 126. When a fish container 130 is inserted into the receiving slots 141, as shown in FIGS. 10 and 12, the rear displacement flange 137 of the container 130 passes through slot 143 and pivots the directional channel 151 such that it is now tilted to the front and water from the transverse supply conduit 128 flows into the container 130 and passes through the rear outflow opening 135 into the transverse return trough 126. When the fish container 130 is removed, the water pressure from the transverse supply conduit 128 pushes down the rear of the directional channel 151 such that water again flows directly into the transverse return trough 126.

Excess water from the gravity tank 117 and the water delivered into the transverse return troughs 126 from the outflow openings 135 of the containers 130, or directly from the transverse supply conduits 128 when no container 130 is in position, pass through side return openings 116 into a vertically oriented return conduit 114, such that the water is delivered back to the reservoir tank 110 for recirculation.

Water flow paths through the apparatus 120 comprise a supply path as it is pumped up the supply conduit 112 from the reservoir tank 110 to the gravity tank 117, and then down through the distribution conduit 118 and into the transverse supply conduits 128 and out the individual openings 129 onto the directional channels 151 of the rocker valves 150. Water is then directed directly into the transverse return troughs 126 or into the fish containers 130 and then back into the transverse return troughs 126 through the rear outflow openings 135 in the fish containers 130. Water then passes from the transverse return troughs 126 into the vertical return conduit 114 and back into the reservoir tank 110 for recirculation.

Operation of the apparatus 120 is accomplished by providing a plurality of individual containers 130 each containing water and one or more fish. The lateral flanges 136 of the containers 130 are positioned in the receiving slots 141 such that each container 130 is associated with a rocker valve 150, the presence of a container 130 tilting the rocker valve 150 to deliver water into the container 130. In this manner fresh water is constantly circulated through the containers 130, the excess water from each container 130 passing from the outflow opening 135 into the transverse return troughs 126 for delivery through the return conduit 114 into the reservoir tank 110. When no container 130 is present at a given location or a container 130 is removed from the shelf array assembly 120, the water flows directly into the transverse supply troughs 126, into the return conduit 114 and then back into the reservoir tank 110. The containers 130 may be provided with barcodes or other pricing indicia. Preferably, container lids or covers that also seal the outflow opening 135 are provided for use at time of purchase when the containers 130 are to be kept by the customer.

With this apparatus 120, a plurality of fish containers 130 may be optimally displayed during business hours, the apparatus 120 providing for a continuous flow of water through the containers 130 to provide an invigorating and healthy environment for the fish. Consumers may choose and remove individual containers 130 for purchase without requiring assistance from the store personnel. Restocking the containers 130 is easily accomplished since each container 130 can be individually removed and replaced. Because of the automatic operation of the rocker valves 150, any number of containers 130 less than the maximum allowable number may be accommodated at any given time.

Preferably the reservoir tank 110 and the shelf array assembly 120 are constructed as a single unit, but it is understood that these components could be physically separated and hoses, tubes or the like used to deliver water from the reservoir tank 110 to the supply conduit 112 and to return water to the reservoir tank 110 from the return conduit 114. Preferably the containers 130 extend beyond the front of the shelves 140 of the display apparatus such that external light will illuminate the containers 130, and/or LED's or similar lights may be provided for this purpose. Drains may be provided in the in the upper surfaces of the shelves 140 to redirect any spillage into the transverse return troughs 126.

Figure 15:
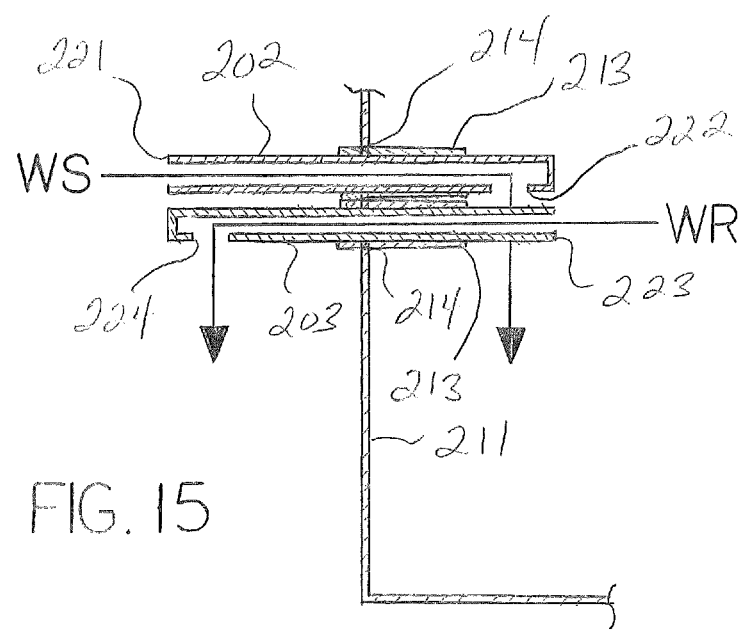
FIG. 15 is a partial cross-sectional illustration showing the orientation of the water supply tube and water return tube within the open self-sealing valves when the container of FIG. 13 is placed onto the display apparatus.

A third embodiment is illustrated in FIGS. 13 through 16, wherein the water is supplied to the individual containers 210 through a vertically oriented supply conduit in fluid communication with multiple horizontally oriented, elongated, transverse water supply conduits or chambers 201. Alternatively, conduit 201 may comprise a manifold-type tubing assembly bringing water directly to water supply tubes 202. Individual containers 210 are received by the multi-shelf assembly 207 and arrayed in rows adjacent the transverse water supply conduits 201 in association with paired water supply tubes 202 and water return tubes 203, the water supply tubes 202 being in fluid communication with the water supply conduit 201. Each of the individual containers 210 is provided with a pair of self-closing, one-way valves 213 mounted in wall openings 214, the valves 213 being positioned to mate and communicate with the water supply tubes 202 and water return tubes 203. In the embodiment illustrated, the valves 213 are duck-billed valves, wherein the insertion of a tubular member forces open a slit positioned in the end of the valve. One valve 213 receives the water supply tube 202 and the other valve 213 receives the water return tube 203, the valves 213 being opened by the tubes 202/203 when a container 210 is loaded in the display system. When a container 210 is removed from the system the valves 213 close automatically, such that water cannot flow leak from the container 210. In this manner water is continuously delivered into and removed from the container 210 when the fish container 210 is in place. The water return tube 203 delivers excess water from each container 210 into a lower water return conduit, chamber or trough 204, preferably through a vertically oriented discharge chute 206 in communication with the return conduit 204. Water from the transverse return conduits 204 enters a vertically oriented return conduit and is delivered back into the reservoir tank as explained in prior embodiments. Preferably the water return tube 203 is positioned at a lower height than the water supply tube 202, as shown in FIG. 15.

Each water supply tube 202 is provided with an inflow opening 221 and an outflow opening 222. Each water return tube 203 is provided with an inflow opening 223 and an outflow opening 224. In the embodiment shown, the outflow openings 222/224 are directed downward, either by angling the end of the tube 202/203 or preferably as shown providing a hole on the underside of the tube 202/203 with the end of the tube being otherwise sealed, such that water flowing from the outflow openings 222/224 of the tubes 202/203 is downwardly directed.

The water supply tube 202 is oriented such that the inflow opening 221 is disposed within the water supply conduit 201 to allow the passage of water from the water supply conduit 201 through the water supply tube 202 into the fish container 210. The water supply tube 202 extends a sufficient distance from the water supply conduit 201 so as to pass through the wall opening 214 in the container base 211 such that the outflow opening 222 is positioned within the container 210.

In the embodiment shown, the water return tube 203 is mounted to or adjacent the water supply conduit 201, but is not in fluid communication with the water supply conduit 201. The water return tube 203 is oriented in opposite manner to that of the water supply tube 202, such that the inflow opening 223 extends into the fish container 210 and the outflow opening 224 is external to the fish container 210. Excess water from fish container 210 passes through the water return tube 203 and into the discharge chute 206 through the outflow opening 224. Alternatively, the outflow opening 224 of the water return tube 203 could be structured as the open end of the tube 203, providing the water is diverted by the wall of the discharge chute 206 or other means so as to flow into the transverse return conduit 204. In still another embodiment, a flexible tube leading down to the transverse return conduit 204 could be incorporated onto the end of the water return tube 203, which obviates the need for the discharge chute 206.

The transverse return conduits 204 may directly provide a supporting surface for the containers 210, or alternatively a separate supporting surface or horizontal shelving may be provided as part of the multi-shelf assembly 207. Bypass openings 205 are provided in the supporting surface at locations corresponding to the location of the outflow openings 222 of the water supply tubes 202. In this manner, when a container 210 is removed, water discharged downward from the water supply tube 202 passes through the bypass openings 205 and into the transverse return conduits 204. When a container 210 is removed from its corresponding water supply tube 202 and water return tube 203, the two self-closing valves 213 are no longer held open by the tubes 202/203 and the lidded container 210 is sealed against leakage. Because the container 210 has been removed, water no longer enters the water return tube 203.

In use, the multi-shelf assembly 207 is loaded with fish containers 210, each fish container 210 being slotted into a station such that the container 210 is pushed onto the water supply tube 202 and water return tube 203, thereby opening the self-sealing valves 213 in the container 210. The pumping system is operated continuously, such that water from the reservoir is passed into the water supply conduits 201, through the fish containers 210 if present, into the transverse return chambers 204 and back into the water reservoir. Thus, each container 210 has a continuous exchange of water coming into the container 210 from the water supply tube 202 and exiting the container 210 through the water return tube 203. When a customer removes a container 210, there is no water flow into the water return tube 203 and water falling from the water supply tube 202 goes directly into the water return conduit 204. With this system, it is not necessary to manually turn off water flow into a container 210 when it is about to be removed and it is not necessary to start water flow when a container 210 is placed into position.

Figure 17:
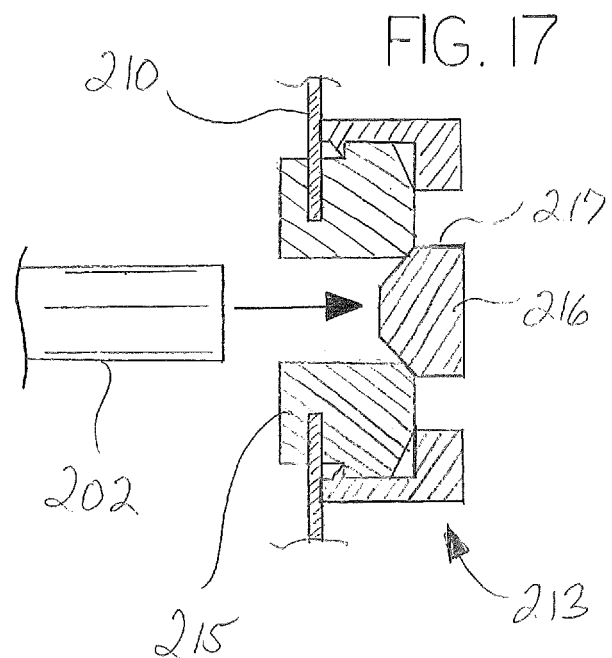
FIG. 17 is a partial cross-sectional view of an alternative embodiment for a self-sealing, one-way valve.

An alternative embodiment for the self-closing, one way valves 213 is shown in FIG. 17, where the valve 213 is a displacement valve comprising a resilient sealing member 215 in combination with a cap member 216, the cap member 216 being provided with flow apertures 217. The seal member 215 seals the wall opening 214 and the apertures 217 until a water supply tube 202 or water return tube 203 is inserted, which separates the cap member 216 from the seal member 215 such that water will flow through the apertures 217.

Figure 18:
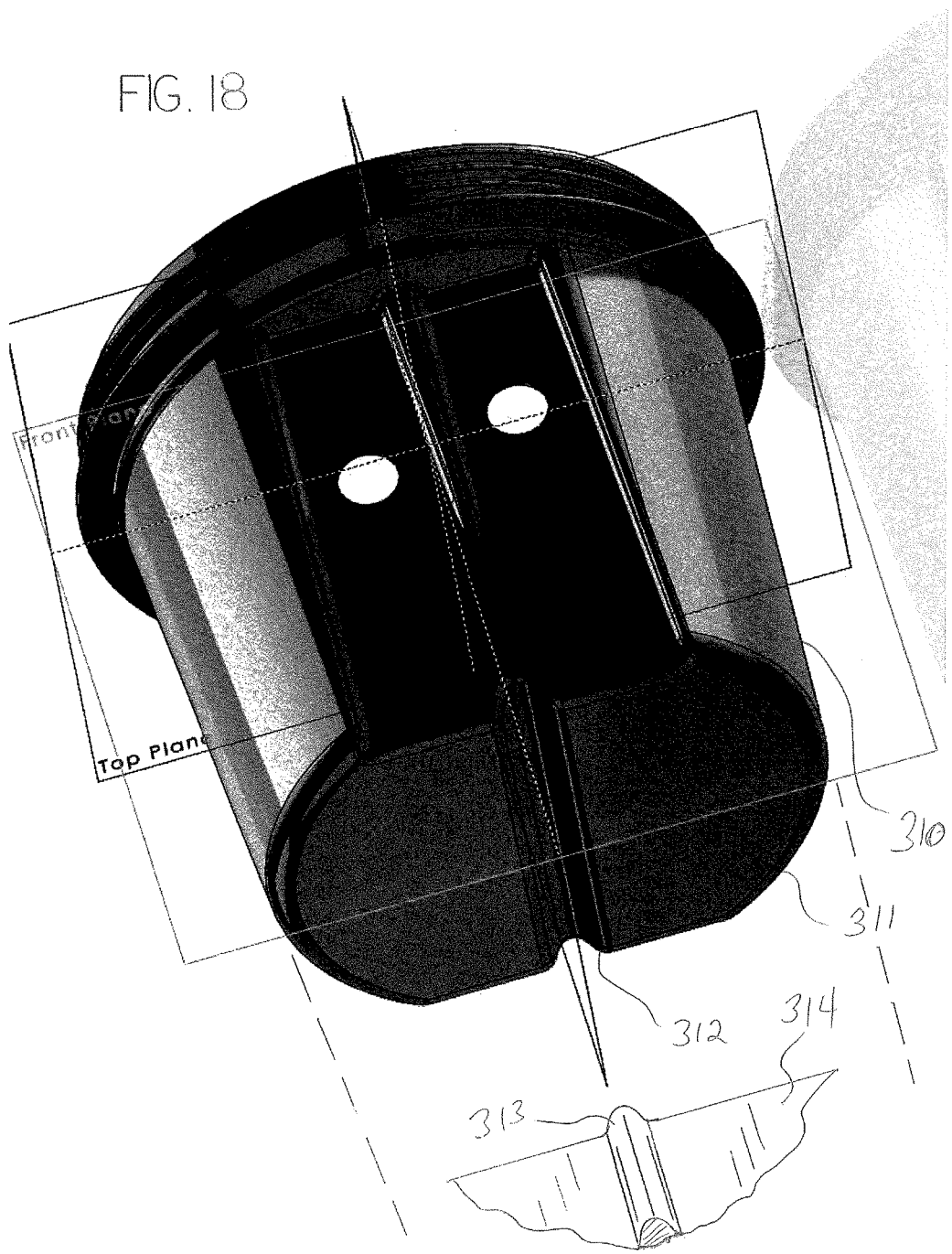
FIG. 18 is a view of an alternative embodiment of a fish container showing an alignment slot and ridge.
Figure 19:
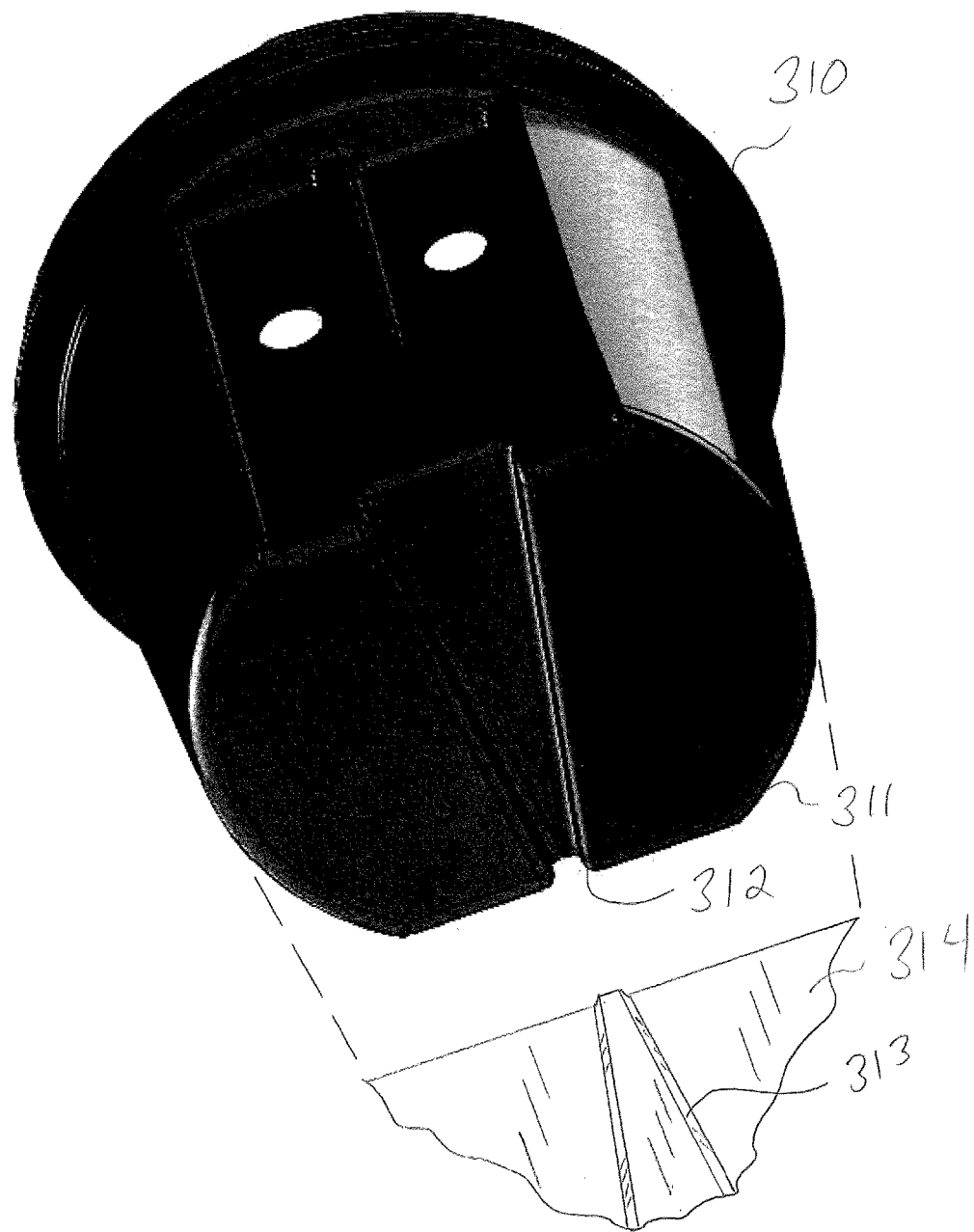
FIG. 19 is a view of another alternative embodiment of a fish container showing a tapered alignment slot and ridge.

Alignment of the containers of any of the embodiments may be accomplished by physical manipulation alone, but it is preferred that physical alignment features be provided to insure that the containers are properly seated with the water inflow and outflow mechanisms. For example, the shelf array assembly may be provided with walls or partitions at each container location that preclude misalignment of the container. Another alternative is to provide a fish container and supporting surface with corresponding mating physical features, such as the embodiments shown in FIGS. 18 and 19, wherein the bottom of a container 310 is provided with an alignment slot or groove 312 that corresponds to an alignment tongue or ridge 313 positioned on the multi-shelf assembly 314. The structures may be linear, as shown in FIG. 18 or tapering as shown in FIG. 19. Such structure insures that the container 310 is properly located transversely and that the container 310 is properly rotated to mate with the water supply and return tubes.

It is understood and contemplated that equivalents and substitutions for elements and structures described above may be obvious to those of skill in the art, and therefore the true scope and definition of the invention is to be as set forth in the following claims.

I claim:

1. A fish display and water circulation apparatus comprising:
   a plurality of individually removable containers;
   a multi-shelf assembly comprising a plurality of transverse water supply conduits and transverse water return conduits and adapted to receive said plurality of individually removable containers;
   a reservoir tank retaining water, said reservoir tank in fluid communication with said water supply conduits and said water return conduits;
   a water pump delivering water from said reservoir tank to said water supply conduits;
   water supply tubes in fluid communication with said water supply conduit and water return tubes in fluid communication with said water return conduits;
   each individually removable container of said plurality of individually removable containers comprising a pair of self-closing, one-way valves, one of said pair of valves positioned to mate and fluidly communicate with one of said water supply tubes and the other of said pair of valves positioned to mate and fluidly communicate with one of said water return tubes when said container is received on said multi-shelf assembly;
   wherein said water supply tubes and said water return tubes open said valves when said water supply tubes and said water return tubes are mated with said pair of valves in said container, such that water flows into said container through said water supply tube and water flows from said container through said water return tube; and
   wherein upon removal of said container from said multi-shelf assembly said valves automatically close to preclude water flowing from said container and water from said water supply tube is directed into said water return conduit;
   each of said pair of valves comprising a sealing member with an outer side, an opposite inner side, and an first aperture extending from the outer side to the inner side; a resilient seal abutting the inner side of sealing member, the resilient seal including a protruding plug extending towards the first aperture of the sealing member, the protruding plug having a periphery and being sized and shaped to be received in and seal the inner side of the first aperture of the sealing member when the resilient seal is in an undeformed configuration, and the resilient seal being deformable to an open configuration with the protruding plug being substantially external to the inner side of the first aperture; and at least one aperture in the resilient seal at the periphery of the protruding plug, the at least one aperture providing a flow path from the first aperture to one of the individually removable container of said plurality of individually removable containers when the resilient seal is urged to the open configuration by one of said water supply tubes and said water return tubes.

2. The apparatus of claim 1, said water supply tubes each comprising a downwardly directed outflow opening and said water return conduit comprising bypass openings, each said bypass opening positioned beneath one of said outflow openings of said water supply tubes, wherein upon removal of said container from said multi-shelf assembly water is directed through said outflow opening and into said water return conduit through said bypass opening.

3. The apparatus of claim 1, wherein said sealing member and resilient seal are concentric.

4. The apparatus of claim 1, further comprising a discharge chute associated with each said water return tube, each said discharge chute being in fluid communication with one of said water supply conduits, wherein with said container received by said multi-shelf assembly water from said container passes through said water return tube and into said water return conduit through said discharge chute.

5. The apparatus of claim 1, wherein each said container comprises an alignment slot and said multi-shelf assembly comprises alignment ridges to properly align said containers on said multi-shelf assembly.

6. The apparatus of claim 2, wherein each said container comprises an alignment slot and said multi-shelf assembly comprises alignment ridges to properly align said containers on said multi-shelf assembly.

7. The apparatus of claim 4, wherein each said container comprises an alignment slot and said multi-shelf assembly comprises alignment ridges to properly align said containers on said multi-shelf assembly.

8. The apparatus of claim 2, further comprising a discharge chute associated with each said water return tube, each said discharge chute being in fluid communication with one of said water supply conduits, wherein with said container received by said multi-shelf assembly water from said container passes through said water return tube and into said water return conduit through said discharge chute.

9. The apparatus of claim 1, wherein said protruding plug is frusto-conical.

10. The apparatus of claim 1, wherein water flow through said containers is continuous when said water pump is in operation.

11. The apparatus of claim 8, wherein each said container comprises an alignment slot and said multi-shelf assembly comprises alignment ridges to properly align said containers on said multi-shelf assembly.

12. The apparatus of claim 5, wherein said alignment slots and said alignment ridges are tapered.

* * * * *